United States Patent [19]

Ito et al.

[11] Patent Number: 4,742,809
[45] Date of Patent: May 10, 1988

[54] FUEL TANK

[75] Inventors: Takaaki Ito, Mishima; Koji Uranishi, Susono, both of Japan

[73] Assignee: Toyota Jidosha Kabushiki Kaisha, Aichi, Japan

[21] Appl. No.: 831,574

[22] Filed: Feb. 21, 1986

[30] Foreign Application Priority Data

Feb. 23, 1985 [JP] Japan .............................. 60-24180[U]

[51] Int. Cl.⁴ ............................................ F02M 37/00
[52] U.S. Cl. ................................... 123/519; 123/516; 220/85 VR
[58] Field of Search ............... 123/516, 518, 519, 520, 123/521; 220/85 VR, 86 R, 85 SP

[56] References Cited

U.S. PATENT DOCUMENTS 3,542,239 11/1970 Latuala .............................. 123/519
3,884,204 5/1979 Krautwurst ........................ 123/519
3,907,153 9/1975 Mutty .
4,000,727 1/1977 Walker ............................. 123/519
4,308,840 1/1982 Hiramatsm ....................... 123/519
4,462,158 7/1984 Wehle ............................... 123/516

FOREIGN PATENT DOCUMENTS 59-10377 4/1984 Japan .
59-173749 11/1984 Japan .
1316161 5/1973 United Kingdom ................ 123/519

Primary Examiner—Carl Stuart Miller
Attorney, Agent, or Firm—Finnegan, Henderson, Farabow, Garrett and Dunner

[57] ABSTRACT

A fuel tank including a tank body, a fuel supply pipe mounted on the tank body, and a canister connected to the tank body. The fuel supply pipe is provided with a closing valve therein, the canister is connected to the tank body through a first fuel vapor passage having a change-over control valve. The fuel injection pipe is further communicated with the tank body through a second fuel vapor passage. The change-over valve is interlocked to the closing valve so that the change-over valve opens the first fuel vapor passage along with opening of the closing valve when a fuel feed nozzle is inserted into the fuel injection pipe.

5 Claims, 4 Drawing Sheets

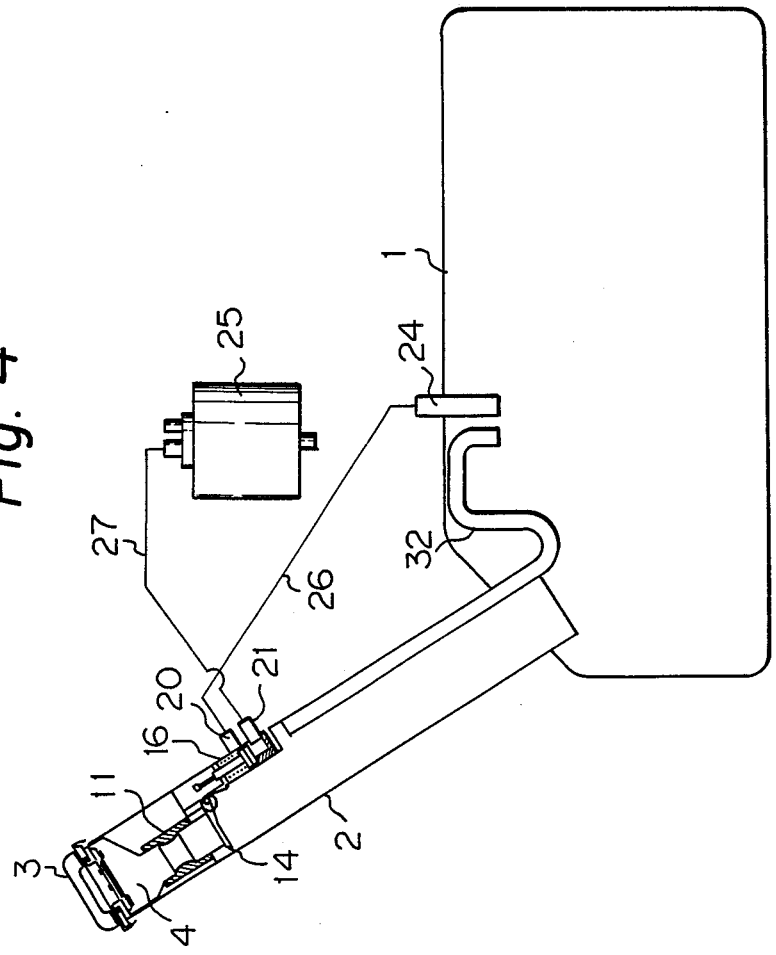

FUEL TANK

BACKGROUND OF THE INVENTION (1) Field of the Invention

The present invention relates to a fuel tank mainly used for automobiles, more particularly to a construction of a fuel tank for preventing fuel from discharging into the atmosphere when the tank is being filled.

(2) Description of the Related Art

When refueling a vehicle driven by an internal combustion engine, such as a gasoline engine, one uncaps the fuel inlet of the fuel tank and inserts a fuel feed nozzle. However, when the fuel in the tank is low, there is a large quantity of pressurized fuel vapor in space above the liquid surface of the fuel. When the cap is removed, the fuel vapor in the tank escapes to pollute the outside air. Also, while the liquid fuel is filled into the fuel tank, it strikes the fuel within the tank, creating bubbles which again escape to pollute the outside air.

U.S. Pat. No. 3,884,204 and U.S. Pat. No. 3,907,153 disclose an apparatus in which a blowhole is arranged adjacent to an inlet of a fuel feed port so that the fuel vapor is guided to a canister from the blowhole and thus prevented from escaping outside.

In the above known apparatus, however, when the fuel is actually filled into the tank, it flows against the flow of the fuel vapor in the tank and prevents the fuel vapor from being properly drawn out to the canister. As a result, the fuel arrives back at the fuel inlet before it completely fills the tank, thus actuating an automatic shut-down mechanism for fuel feed and preventing satisfactory fueling.

Further, in a fuel tank with a blowhole directly mounted on the tank body, since the fuel inlet is closed, negative pressure is generated within the fuel supply pipe. This promotes bubbling of the fuel. The automatic shut-down mechanism of the fuel feed nozzle is covered with the above bubbles and thus actuates. Consequently, the refueling is not accomplished satisfactorily.

SUMMARY OF THE INVENTION

The object of the present invention is to solve the above problems by keeping the pressure within the tank at almost atmospheric pressure and preventing the fuel from bubbling, thus allowing the fuel to flow into the tank smoothly.

In order to solve the above problems, the present invention ensures the quick flow of fuel vapor accumulated within a fuel tank to a canister during the refueling. The fuel tank is connected to a canister. The fuel is kept from bubbling by keeping the pressure at the fuel inlet of the fuel supply pipe at almost atmospheric pressure. This is done by connecting a blowhole at the upper portion of the fuel supply pipe to the fuel tank.

Additional objects and advantages of the present invention will be set forth in the description that follows and in part will be obvious from the description or may be learned by practice of the invention. The objects and advantages of the invention may be realized and obtained by the apparatus particularly pointed out in the appended claims.

According to the present invention, there is provided a fuel tank including: a tank body; a fuel supply pipe mounted on the tank body, the pipe being provided with a nozzle guide for insertion of a fuel feed nozzle, the nozzle guide being provided at the end thereof with a closing valve which is opened only when the fuel feed nozzle is inserted into the nozzle guide; a canister connected to the tank body through a first fuel vapor passage, the passage being provided therein with a change-over control valve which communicates the inside of the tank body with the canister along with opening of the closing valve; and second fuel vapor passage directly communicating the upper inside portion of the fuel supply pipe with the tank body.

According to the preferred embodiments, the second fuel vapor passage is placed inside the fuel supply pipe. The nozzle guide is composed of upper and lower nozzle guides and a seal pipe disposed between the upper and lower nozzle guides, the seal pipe being made of a resilient material having an inwardly projecting wall thickness portion. The closing valve is provided with an arm, the arm engaging a valve rod of the change-over control valve when the closing value is rotated about its pivot, whereby the arm opens the change-over control valve.

The accompanying drawings which are incorporated in and constitute a part of this specification, illustrate presently preferred embodiments of the invention and, together with the description serve to explain the principles of the invention.

BRIEF DESCRIPTION OF THE DRAWINGS

FIG. 4 is a front partially cut away and partially schematic view of a second embodiment of a fuel tank vapor system of the present invention.

DESCRIPTION OF THE PREFERRED EMBODIMENTS

Preferred embodiments of the present invention will be described with reference to the accompanying drawings.

Figure 1:
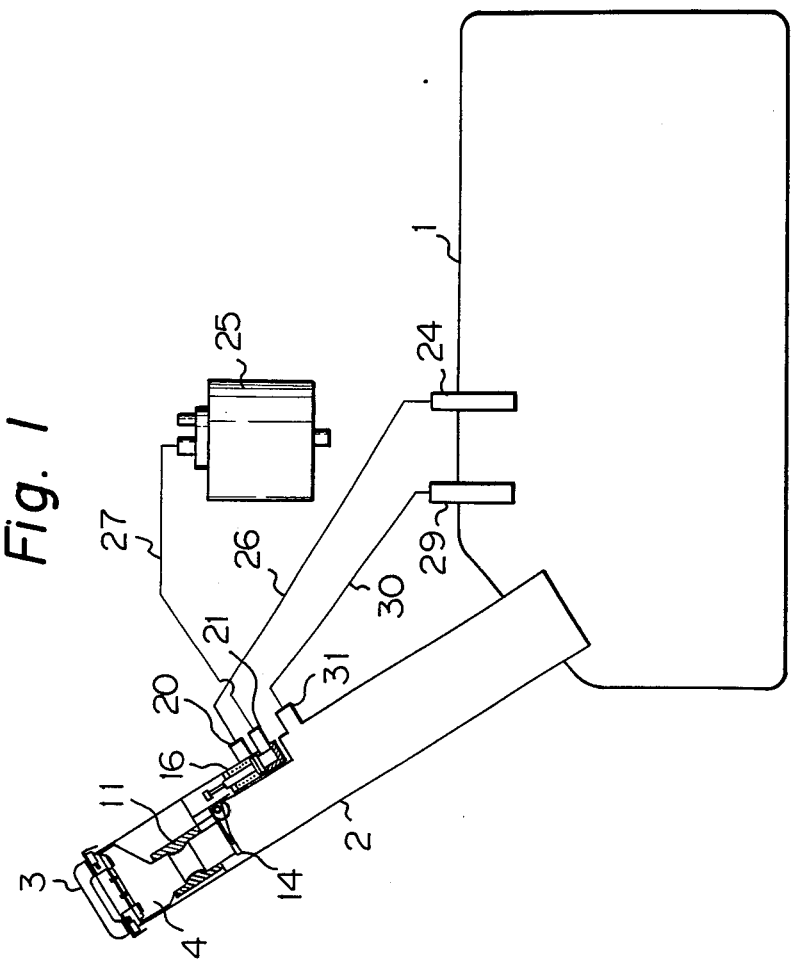
FIG. 1 is a front partially cut away and partially schematic view of a first embodiment of a fuel tank vapor system of the present invention.
Figure 2:
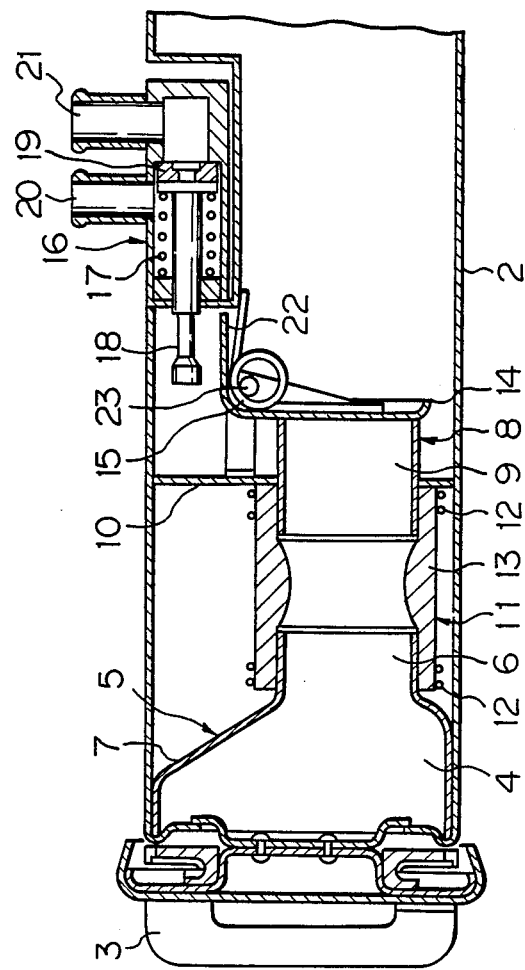
FIG. 2 is an enlarged fragmentary sectional view of a fuel inlet portion of the embodiment shown in FIG. 1.
Figure 3:
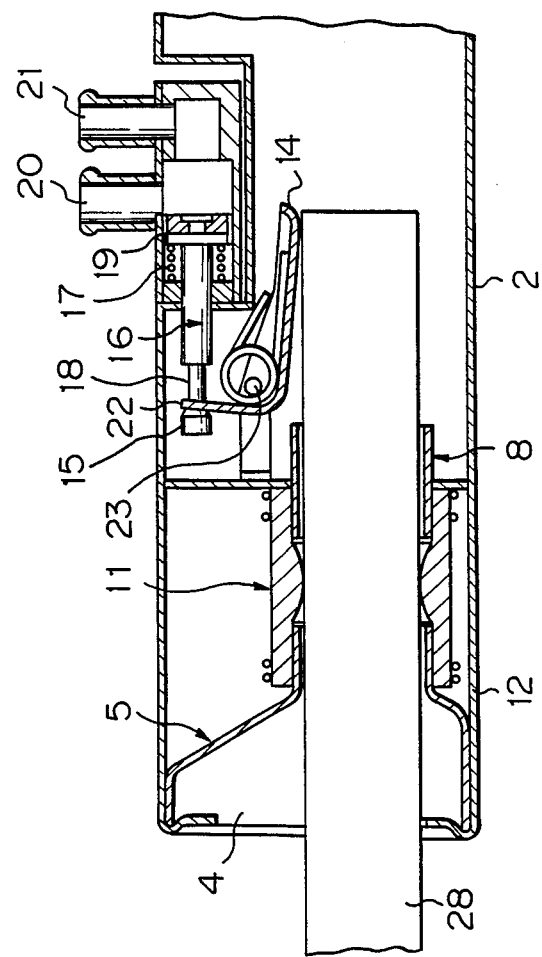
FIG. 3 is a sectional view similar to FIG. 2 when a fuel feed nozzle is inserted into a fuel supply pipe in the above embodiment.

FIGS. 1 to 3 show a first embodiment of the present invention. Referring to FIG. 1, numeral 1 designates a fuel tank body. A fuel supply pipe 2 is mounted on the tank body 1 and extends obliquely upward. A cap 3 is removably attached to a fuel inlet 4 formed at the upper end of the fuel supply pipe 2.

Referring to FIG. 2, the detailed construction of the portion adjacent to the fuel inlet 4 will be described.

An upper nozzle guide 5 is attached to the fuel inlet 4. The upper nozzle guide 5 comprises, at the lower portion, a cylindrical nozzle insertion passage 6 at one side and having a decreased diameter. The upper portion 7 of the passage 6 presents a horn-shaped configuration, and the upper nozzle guide 5 is fixed to the inner wall of the fuel supply pipe 2 by the horn-shaped portion 7. A lower nozzle guide 8 is spaced under the nozzle insertion passage 6. The lower nozzle guide 8 comprises a cylindrical nozzle insertion passage 9 of the same diameter as that of the upper nozzle insertion passage 6 and is fixed to the inner wall of the fuel supply pipe 2 by a flange portion 10. A cylindrical seal pipe 11 is disposed between the upper and lower nozzle insertion passages 6 and 9. The seal pipe 11 is made of a resilient material such as rubber, is closely fitted on the nozzle insertion passages 6 and 9 at the upper and lower ends thereof, and is fastened to the nozzle insertion passages 6 and 9 by clamps 12. The seal pipe 11 is provided, at an intermediate portion remote from the nozzle insertion passages 6 and 9, with an inwardly projecting wall thickness portion 13. The inner diameter of the wall thickness portion 13 is slightly smaller than the outer diameter of a fuel feed nozzle.

A closing valve 14 is attached to the lower end of the lower nozzle guide 8, which is pushed down and opened by the end of the fuel feed nozzle inserted into the lower nozzle guide 8. The closing valve 14 normally closes the nozzle insertion passage 9 by a spring 15 when the cap 3 is fitted on the fuel inlet 4.

A change-over control valve 16 is arranged adjacent to the closing valve 14, which is controlled to open and close along with the opening and closing of the closing valve 14. The change-over control valve 16 normally pushes down a valve rod 18 by a spring 17 and prevents communication of a passage 20 to the tank body 1 with a passage 21 to a canister by a valve seal 19. Also, the closing valve 14 is provided with an arm 22 for engaging the valve rod 28 when the closing valve 14 is rotated about its pivot 23.

Referring to FIG. 1 again, the tank body 1 is provided with a first fuel vapor outlet 24 at the upper wall thereof. The outlet 24 is connected to a canister 25 containing a fuel absorbent such as activated carbon through the passages 20 and 21. The canister 25 exclusively serves to absorb the fuel vapor only when the fuel is being filled into the tank body 1. Incidentally, another canister (not shown) is provided in order to normally absorb the fuel vapor within the tank body 1.

A fuel vapor passage 26 connects the first fuel vapor outlet 24 to the passage 20. Another fuel vapor passage 27 connects the passage 21 to the canister 25. These passages 26 and 27 constitute a first fuel vapor passage.

FIG. 3 shows the state where a fuel feed nozzle has been inserted into the above fuel supply pipe 2.

The cap 3 is removed from the fuel inlet 4, and then a fuel feed nozzle 28 is inserted into the nozzle guides 5 and 8. The seal pipe 11 abuts the outer surface of the fuel feed nozzle 28 at the wall thickness portion 13. Since the seal pipe 11 is slightly expanded outward, the seal pipe 11 engages the fuel feed nozzle 28 in a resilient seal manner and thus the inside of the tank body 1 is shut off from the outside air completely. When the fuel feed nozzle 28 is further inserted all the way inside the fuel supply pipe 2, the closing valve 14 is pushed down by the end of the fuel feed nozzle 28 and rotated about is pivot 23 as shown in FIG. 3. The rotation of the closing valve 14 opens the nozzle passage 9 of the lower nozzle guide 8 and thus communicates the fuel inlet 4 with the inside of the tank body 1. Consequently, the fuel is fed from the fuel feed nozzle 28 to the inside of the tank body 1. According to the above rotation of the closing valve 14, the arm 22 is also rotated, the end of the arm 22 engages the valve rod 18 of the change-over control valve 16 and lifts the valve rod 18 against the force of the spring 17, and thus the passage 20 is communicated with the passage 21 as shown in FIG. 3. Consequently, the fuel vapor in the tank body 1 and the fuel vapor generated due to the fed fuel striking the fuel in the tank body 1 are both absorbed by the activated carbon in the canister 25. Thus, the fuel vapor is absorbed in the canister 25 through the first fuel vapor passage 26, 27 while the fuel is fed into the tank body 1 and prevented from escaping to the outside air.

The tank body 1 is further provided with a second fuel vapor outlet 29, which is communicated with a blowhole 31 mounted on the upper portion of the fuel supply pipe 2 through a second fuel vapor passage 30. The blowhole 31 is preferably mounted on the upper portion of the fuel supply pipe 2. In this embodiment, it is mounted just under the change-over control valve 16. Furthermore, the fuel vapor absorbed by the activated carbon in the canister 25 is sucked in an intake passage of the engine through a leading pipe (not shown) when the engine is in a predetermined driving condition.

In this way, even if the cap 3 is removed from the fuel inlet 4, since the nozzle insertion passage 9 is closed by the closing valve 14, the inside of the tank body 1 is prevented from communicating with the outside air. Also, when the fuel feed nozzle 28 is inserted into he fuel supply pipe 2, since the closing valve 14 is opened and the tank body 1 is communicated with the canister 25 at the same time, the fuel vapor generated in the tank body 1 is absorbed in the canister 25 and prevented from escaping to the outside air.

Since the tank body 1 is communicated with the blowhole 31 mounted on the upper portion of the fuel supply pipe 2 through the second fuel vapor passage 30, the pressure in the vicinity of the fuel inlet 4 of the fuel supply pipe 2 is always kept at the pressure of the inside of the tank body 1, i.e., general atmospheric pressure, no negative pressure is generated during fuel supply. Thus, the fuel is prevented from bubbling and the fuel supply efficiency is improved.

FIG. 4 shows a second embodiment of the present invention.

In the second embodiment, a second fuel vapor passage 32 communicating the tank body 1 with the upper portion of the fuel injection pipe 2 is installed inside the fuel supply pipe 2.

According to the above construction, since the second fuel vapor passage 32 does not appear outside, no additional space is required to mount the fuel tank in the vehicle and the second fuel vapor passage 32 is protected from damage.

According to the present invention, since the closing valve normally closing the fuel supply pipe is attached to the end of the nozzle guide provided in the fuel supply pipe for insertion of the fuel feed nozzle, even if the cap is removed from the fuel inlet, the inside of the tank body is prevented from communicating with the outside air. Also, when the fuel feed nozzle is inserted and the closing valve is opened, since the inside of the tank body is communicated with the canister at the same time, the fuel vapor is absorbed in the canister and thus prevented from escaping to the outside air.

Also, since the tank body communicates with the upper portion of the fuel supply pipe, the pressure in the vicinity of the inlet of the fuel supply pipe is kept at atmospheric pressure, no negative pressure is generated, and thus the fuel is prevented from bubbling and the fuel feed efficiency is improved.

The invention in its broader aspects is, therefore, not limited to the specific details, representative apparatus, and illustrative examples shown and described above. Thus, it is intended that all matter contained in the foregoing description or shown in the accompanying drawings shall be incorporated as illustrative and not in a limiting sense.

We claim:

1. A fuel tank vapor system comprising:

a fuel tank having an interior portion and an upper wall;

a fuel supply pipe mounted on said fuel tank, said fuel supply pipe having an inlet with a nozzle guide therein for receiving a fuel feed nozzle, said nozzle guide having a first end facing said inlet and a second end opposite said first end;

a closing valve at said second end of said nozzle guide, said closing valve being operable to open in response to the insertion of the fuel feed nozzle and being operable to close in response to the withdrawal of the fuel feed nozzle from said nozzle guide, said closing valve preventing vapor communication between said fuel tank interior portion and said fuel inlet when closed;

a first vapor passage having an outlet in said fuel tank interior proximate said upper wall;

a fuel vapor absorbing canister in vapor communication with said interior portion of said fuel tank through said first vapor passage;

a change-over control valve provided in said first vapor passage between said vapor passage outlet and said canister, said control valve having an open position and a closed position, said control valve and said closing valve being actuated simultaneously to each said valve's respective open position in response to the insertion of the fuel feed nozzle in said nozzle quide and said valve being actuated to said closed position in response to the withdrawal of the fuel feed nozzle from said nozzle guide; and a second fuel vapor passage having an outlet in said interior portion of said fuel tank proximate said upper wall, said second vapor passage being in vapor communication with the interior portion of said fuel supply pipe.

2. A fuel tank system according to claim 1, wherein said second fuel vapor passage is placed on the inside of said fuel supply pipe.

3. A fuel tank vapor system according to claim 1, wherein said nozzle guide includes upper and lower nozzle guides and a seal pipe is disposed between said upper and lower nozzle guides and is made of a resilient material having an inwardly projecting wall thickness portion, said inwardly projecting portion having a diameter smaller than the diameter of a corresponding portion of the fuel feed nozzle when said nozzle is inserted in said nozzle guide.

4. A fuel tank vapor system comprising:
a fuel tank having an interior portion and an upper wall;

a fuel supply pipe mounted on said fuel tank body, said fuel supply pipe having an inlet with a nozzle guide therein for receiving a fuel feed nozzle, said nozzle guide having a first end facing said inlet and a second end opposite said first end, said nozzle guide including an upper and a lower nozzle guide at said first and second ends, respectively, and a seal pipe disposed between said upper and lower nozzle guides and made of a resilient material having an inwardly projecting wall thickness portion;

a closing valve at said second end of said nozzle guide, said closing valve being operable to open in response to the insertion of the fuel feed nozzle and being operable to close in response to the withdrawal of the fuel feed nozzle from said nozzle guide, said closing valve preventing vapor communication between said fuel tank interior portion and said fuel inlet when closed;

a first vapor passage having an outlet in said fuel tank interior proximate said upper wall;

a fuel vapor absorbing canister in vapor communication with said fuel tank interior through said first vapor passage;

a change-over control valve provided in said first vapor passage between said vapor passage outlet and said canister, said control valve having an open position and a closed position, said control valve being actuated to said open position in response to the insertion of the fuel feed nozzle in said nozzle guide and said valve being actuated to said closed position in response to the withdrawal of the fuel feed nozzle from said nozzle guide; and a second fuel vapor passage having an outlet in said fuel tank interior proximate said upper wall, said second vapor passage being in vapor communication with the interior portion of said fuel supply pipe.

5. A fuel tank comprising:
a fuel tank having an interior portion and an upper wall;

a fuel supply pipe mounted on said fuel tank body, said fuel supply pipe having an inlet with a nozzle guide therein for receiving a fuel feed nozzle, said nozzle guide having a first end facing said inlet and a second end opposite said first end;

a closing valve at said second end of said nozzle guide, said closing valve being operable to open in response to the insertion of the fuel feed nozzle and being operable to close in response to the withdrawal of the fuel feed nozzle from said nozzle guide, said closing valve preventing vapor communication between said fuel tank interior portion and said fuel inlet when closed, said closing valve including an arm and a pivot about which said valve and arm are rotated, said valve being rotated about said pivot upon insertion of the fuel feed nozzle in the nozzle guide;

a first vapor passage having an outlet in said fuel tank interior proximate said upper wall;

a fuel vapor absorbing canister in vapor communication with said fuel tank interior through said first vapor passage;

a second fuel vapor passage having an outlet in said fuel tank interior proximate said upper wall, said second vapor passage being in vapor communication with the interior portion of said fuel supply pipe; and a change-over control valve provided in said first vapor passage between said vapor passage outlet and said canister, said control valve having an open position and a closed position, said control valve being actuated to said open position in response to the insertion of the fuel feed nozzle in said nozzle guide and said valve being actuated to said closed position in response to the withdrawal of the fuel feed nozzle from said nozzle guide, said change-over control valve including a valve rod, said valve rod for being engaged by said arm of said closing valve when said closing valve is rotated about said pivot for opening said change-over control valve, whereby said arm opens said change-over control valve.

* * * * *